(12) United States Patent
Daley, III

(10) Patent No.: US 7,978,464 B2
(45) Date of Patent: *Jul. 12, 2011

(54) BAG COMPUTER TWO PANEL COMPUTER WITH HINGE EXTENSION

(76) Inventor: Charles A. Daley, III, Rawai (TH)

( * ) Notice: Subject to any disclaimer, the term of this patent is extended or adjusted under 35 U.S.C. 154(b) by 60 days.

This patent is subject to a terminal disclaimer.

(21) Appl. No.: 12/383,784

(22) Filed: Mar. 30, 2009

(65) Prior Publication Data

US 2009/0185342 A1    Jul. 23, 2009

Related U.S. Application Data

(63) Continuation-in-part of application No. 11/796,920, filed on May 1, 2007, now abandoned.

(60) Provisional application No. 61/123,308, filed on Apr. 8, 2008.

(51) Int. Cl.
*G06F 1/16* (2006.01)

(52) U.S. Cl. .............................. 361/679.02; 361/679.27

(58) Field of Classification Search .............. 361/679.27
See application file for complete search history.

(56) References Cited

U.S. PATENT DOCUMENTS

| | | | | |
|---|---|---|---|---|
| 5,160,001 A * | 11/1992 | Marceau | | 190/102 |
| 5,217,119 A * | 6/1993 | Hollingsworth | | 206/583 |
| 5,445,266 A * | 8/1995 | Prete et al. | | 206/320 |
| 5,887,723 A * | 3/1999 | Myles et al. | | 206/760 |
| 5,887,777 A * | 3/1999 | Myles et al. | | 224/578 |
| 5,938,096 A * | 8/1999 | Sauer et al. | | 224/625 |
| 5,971,148 A * | 10/1999 | Jackson | | 206/320 |
| 6,149,001 A * | 11/2000 | Akins | | 206/320 |
| 6,249,427 B1 * | 6/2001 | Carroll | | 361/679.03 |
| 6,269,948 B1 * | 8/2001 | Jackson | | 206/320 |
| 6,283,299 B1 * | 9/2001 | Lee | | 206/760 |
| 6,597,568 B2 * | 7/2003 | Ryder | | 361/679.55 |
| 6,685,016 B2 * | 2/2004 | Swaim et al. | | 206/320 |
| 6,763,942 B1 * | 7/2004 | Yeh | | 206/320 |
| 6,956,614 B1 * | 10/2005 | Quintana et al. | | 348/373 |
| 6,962,277 B2 * | 11/2005 | Quintana et al. | | 224/262 |
| 7,265,970 B2 * | 9/2007 | Jordan | | 361/679.27 |
| 2004/0134813 A1 * | 7/2004 | Domotor | | 206/320 |
| 2005/0103815 A1 * | 5/2005 | Lee et al. | | 224/275 |
| 2006/0113203 A1 * | 6/2006 | Daley | | 206/320 |
| 2006/0113213 A1 * | 6/2006 | Daley, III | | 206/576 |
| 2006/0163303 A1 * | 7/2006 | Trutanich | | 224/576 |
| 2007/0159781 A1 * | 7/2007 | Zbikowski | | 361/683 |
| 2007/0199844 A1 * | 8/2007 | Daley, III | | 206/320 |
| 2007/0201201 A1 * | 8/2007 | Daley, III | | 361/683 |
| 2008/0192421 A1 * | 8/2008 | Daley | | 361/681 |
| 2008/0273298 A1 * | 11/2008 | Daley | | 361/683 |
| 2009/0009476 A1 * | 1/2009 | Daley, III | | 345/168 |

(Continued)

FOREIGN PATENT DOCUMENTS

GB         2397512 A  *  7/2004

(Continued)

*Primary Examiner* — Lisa Lea-Edmonds

(57) ABSTRACT

Disclosed are improvements to a two panel computer meant to be mounted to a bag front of a matching bag. The computer has a display panel and body panel pivotally attached with the display fixed to the side of the display panel facing away from the body panel. The hinge is adapted to create a gap between the panels to allow the bag's computer holder to fit between the panels. This gap may be formed by; 1) providing a extension between the body and hinge, 2) using a large diameter hinge with a portion of the diameter creating the extension, 3) providing a extension between the hinge and the display panel.

27 Claims, 5 Drawing Sheets

U.S. PATENT DOCUMENTS

| | | | |
|---|---|---|---|
| 2009/0009938 A1* | 1/2009 | Daley, III | 361/680 |
| 2009/0046416 A1* | 2/2009 | Daley, III | 361/679.55 |
| 2009/0107877 A1* | 4/2009 | Daley, III | 206/576 |
| 2009/0107878 A1* | 4/2009 | Daley, III | 206/576 |
| 2009/0141446 A1* | 6/2009 | Daley, III | 361/679.55 |
| 2009/0185342 A1* | 7/2009 | Daley, III | 361/679.27 |
| 2009/0190296 A1* | 7/2009 | Daley, III | 361/679.27 |
| 2009/0201637 A1* | 8/2009 | Daley, III | 361/679.29 |
| 2009/0225508 A1* | 9/2009 | Daley, III | 361/679.27 |
| 2009/0225509 A1* | 9/2009 | Daley, III | 361/679.29 |
| 2009/0236247 A1* | 9/2009 | Daley, III | 206/320 |
| 2009/0284908 A1* | 11/2009 | Daley, III | 361/679.17 |
| 2010/0193384 A1* | 8/2010 | Daley, III | 206/320 |
| 2010/0220434 A1* | 9/2010 | Daley, III | 361/679.27 |

FOREIGN PATENT DOCUMENTS

JP    2004097801 A  *  4/2004

* cited by examiner

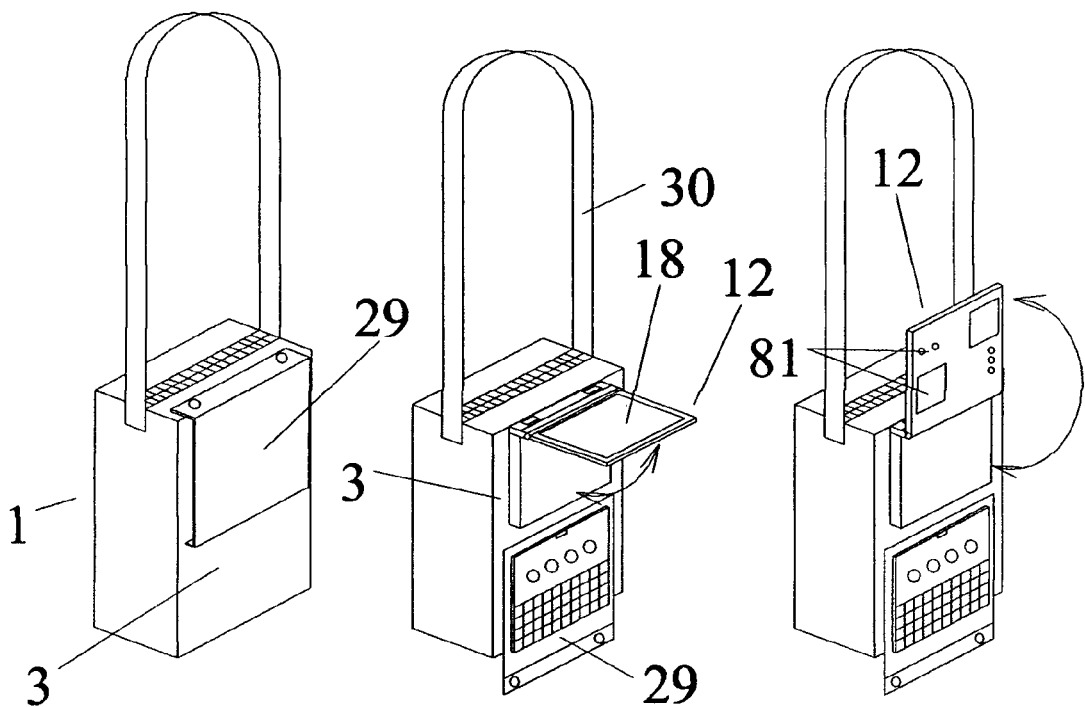
FIG. 1A  FIG. 1B  FIG. 1C
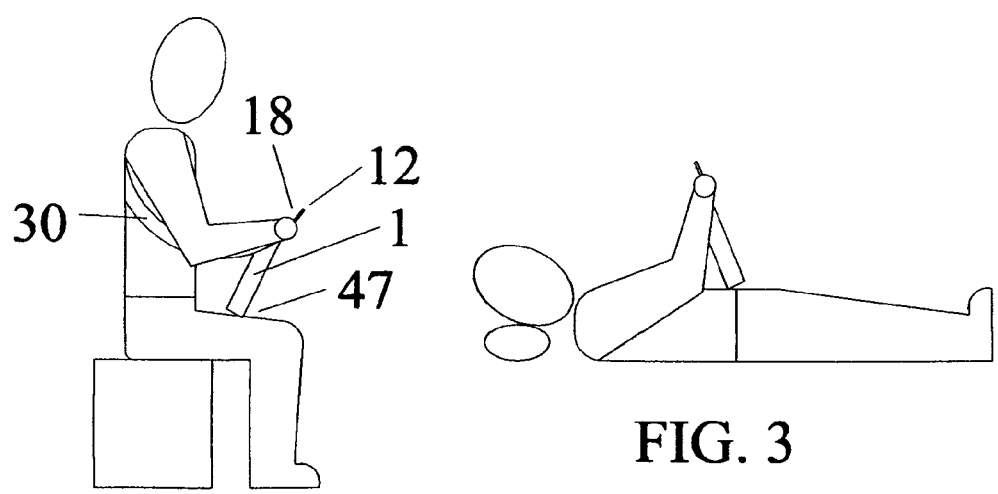
FIG. 2
FIG. 3

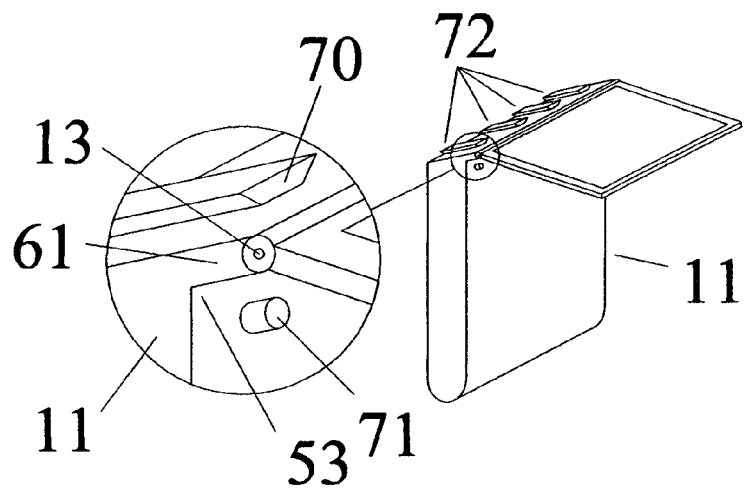
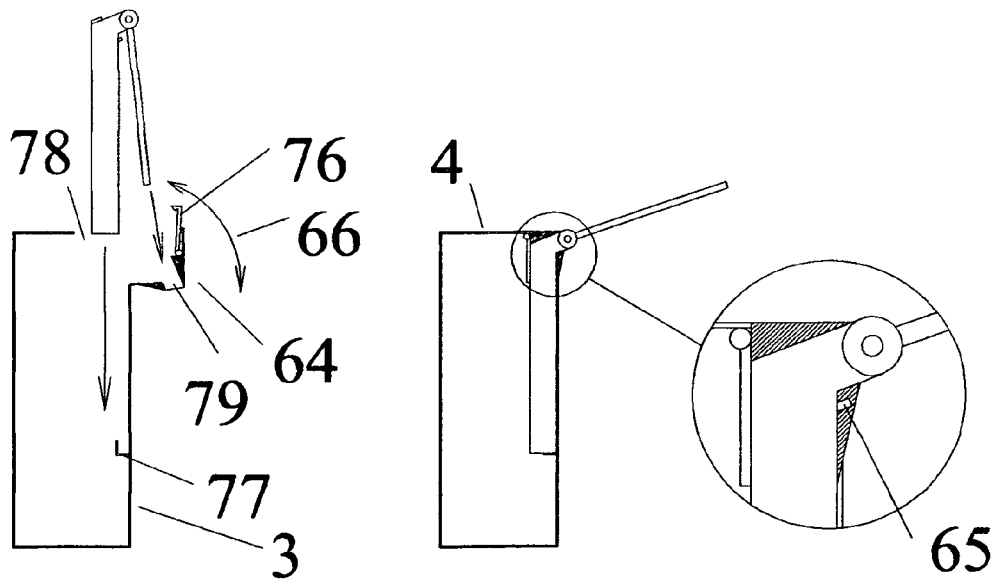

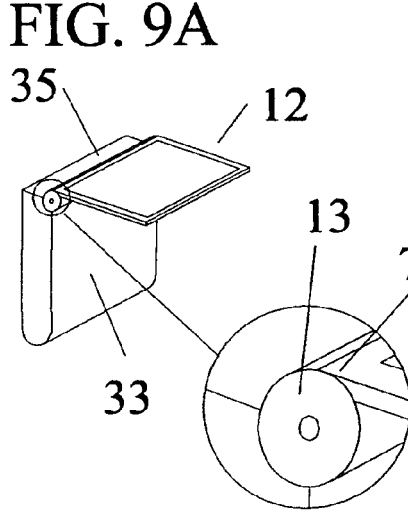
FIG. 9A
FIG. 9B
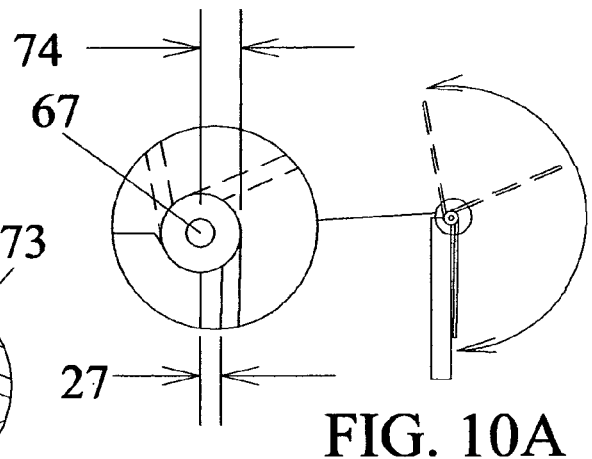
FIG. 10A
FIG. 10B
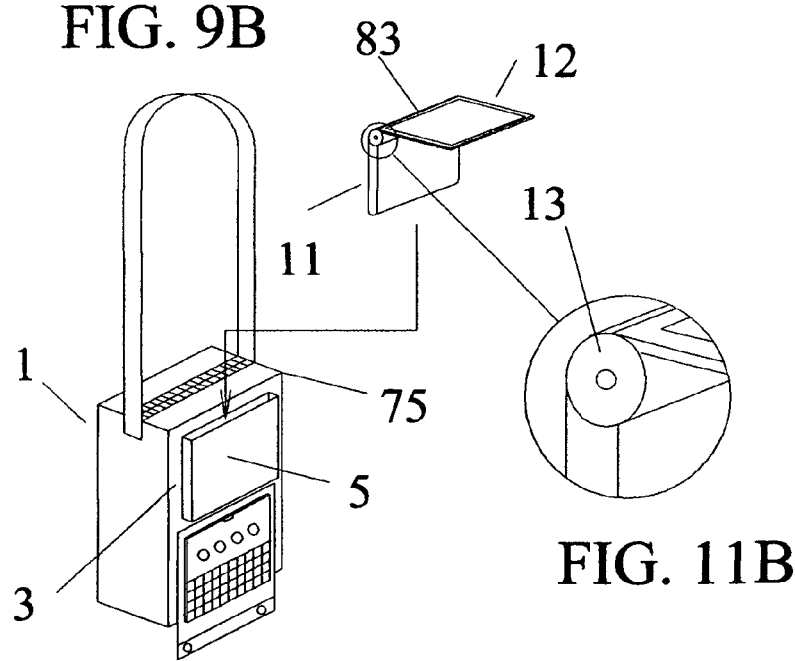
FIG. 11A
FIG. 11B

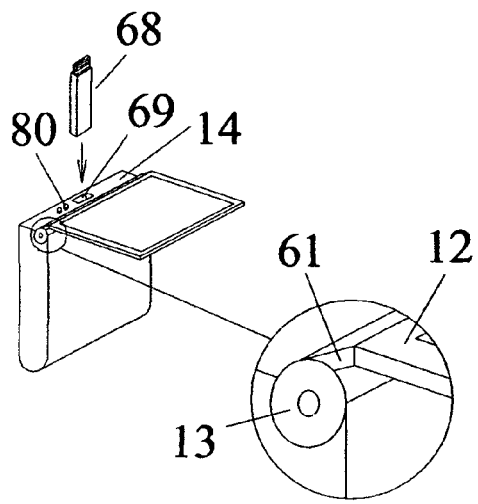
FIG. 12A
FIG. 12B
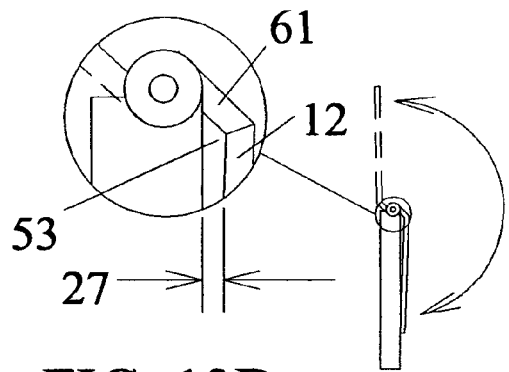
FIG. 13B
FIG. 13A
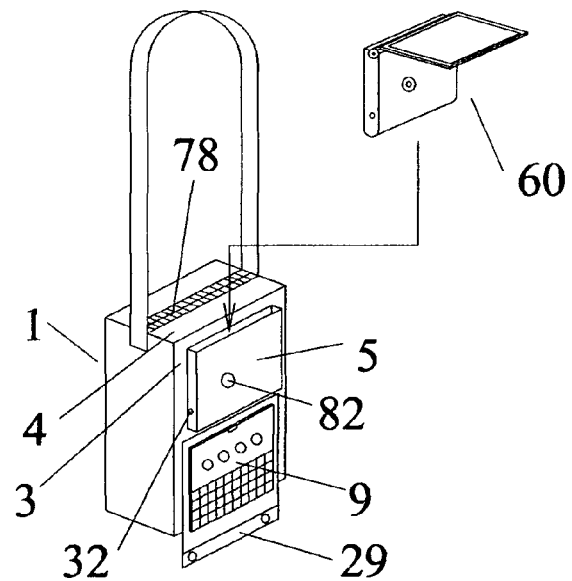
FIG. 14

BAG COMPUTER TWO PANEL COMPUTER WITH HINGE EXTENSION

CROSS-REFERENCE TO RELATED APPLICATIONS

This application is a Continuation-In-Part and claims the filing benefit under 35 U.S.C. §120 of pending U.S. application Ser. No. 11/796,920, filed May 1, 2007 now abandoned and is incorporated herein by reference.

This application claims the filing benefit under 35 U.S.C. §119(e) of U.S. Provisional Application No. 61/123,308, filed on Apr. 8, 2008, the entire teachings of which are incorporated herein by reference.

TECHNICAL FIELD

The present invention relates to a computer designed to mount on a bag front for mobile use.

BACKGROUND OF THE INVENTION

Bag computers are designed to hold a pivoting display panel on their front wall so that the computer can be used with little set up and used a mobile environment while a standing, sitting or lying position. While the bag's shoulder strap holds the bag to the operator, he can use two hands to use the computer controls. Thus, it is a wearable computer.

Bag computer have a pivoting display in their front panel. The display can be stored flat against the bag front and then can be pivoted to about 90 degrees for viewing. The display panel may also be pivoted to 180 degrees so the bag can be set upright in the operator's lap while sitting and viewed over the top of the bag thus bringing the display closer to the user and reducing neck strain.

One way to make a bag computer is to have a two panel computer component mounted to a matching bag front using an outside computer holder or inside mounting structure and coupling. The two panel computer has a body panel and display panel pivotally connected with the display fixed to the display panel side facing away from the body panel. The two panel computer may further be installed in the bag's matching computer holder with it's hinge near the bag top front so that the display panel, when pivoted into the line of sight of the operator/bag wearer, is as close as possible to the operator's eyes. The hinge connecting the two panels may include an extension which creates a gap between the two panels so that the material of the bag's computer holder can fit between the two panels when they are closed together in storage position. This arrangement was described in U.S. application Ser. No. 11/796,920.

Improvements to the hinge and hinge area of the two panel computer can; 1) improve the installation and fit of an inside mounted two panel computer to the bag; 2) allow for a larger, stronger hinge which can also be a venue for related accessories; 3) allow for adjustment of the attachment position of the hinge to the computer body. This application provides embodiments for these improvements.

BRIEF DESCRIPTION OF THE INVENTION

The invention is a continuation of a previous application describing a bag computer. A bag computer is a bag with a display panel pivotally attached to its outside so the display panel may pivot horizontally from a storage position parallel to the bag's front wall to a position away from the bag's front wall where the bag wearer/operator may view the display.

One way of doing this is to have a two panel computer component removably attached to the bag front. The two panel computer has a body panel and display panel pivotally connected with the display fixed to the display panel side facing away from the body panel. The two panel computer may be installed in the bag's matching computer holder with it's hinge near the bag top front so that the display panel, when pivoted into the line of sight of the operator/bag wearer, is as close as possible to the operator's eyes. The body panel may attach to either the inside or outside of the bag's front wall. In either case, the hinge connecting the two panels must include an extension which creates a gap between the two panels so that the material of the bag's computer holder can fit between the two panels when they are closed together in storage position.

One way to create this gap is to put an extension between the computer body and hinge means. If this type of two panel computer is installed to the inside of the bag's front wall, the bag may be adapted for such installation with a slot for the display to pass to the bag exterior and a coupling around the slot to match and connect with the computer near the hinge extension.

A second way to create this extension and gap is to use a large diameter hinge with the display panel attached on or near the perimeter of the hinge. With the hinge's pivot point properly positioned, the hinge's diameter or portion of diameter becomes the extension needed to create the gap between the body and display panels. Such a large diameter hinge may be stronger and may allow for positioning accessories, such as speakers, on the hinge.

In a third way to create this extension and gap, an extension is included between the hinge and the display panel. This type of hinge with extension may be used to more conveniently position the hinge pivot point while still allowing the display panel to pivot between its storage position parallel to the bag front and other viewing positions.

BRIEF DESCRIPTION OF THE SEVERAL VIEWS OF THE DRAWINGS

FIG. 1A This is a bag computer with the cover open and the display panel pivoted down parallel to the bag's front wall.

FIG. 1B This is the bag computer of FIG. 1A with the display panel pivoted to the 90 degree position for viewing while standing.

FIG. 1C This is the bag computer of FIG. 1A with the display panel pivoted to the 180 degree position for viewing from in back of the bag.

FIG. 2 This is a sitting manikin wearing the bag computer with the display panel pivoted to the 180 degree position and using the touch pad of the display panel back.

FIG. 3 This is a lying manikin wearing the bag computer with the display panel pivoted to the 180 degree position and using the touch pad of the display panel back.

FIG. 6A This shows the two panel computer with an extension between the body and hinge to serve to form a gap between the display panel and body panel.

FIG. 6B This is a magnified view of the hinge area of the two panel computer with an extension between the body and hinge.

FIG. 7 This is a cross section of a bag showing how the two panel computer is installed into it.

FIG. 8A This is a cross section of a bag showing the two panel computer already installed into it.

FIG. 8B This is a magnified view of the hinge area of the bag in cross section with the two panel computer installed into it.

FIG. 9A This is the two panel computer with a large diameter hinge to create an extension and serve to form a gap between the display panel and body panel.

FIG. 9B This is a magnified view of the hinge area of the two panel computer with a large diameter hinge.

FIG. 10A This is a profile view of the two panel computer with a large diameter hinge to serve as an extension between the display panel and body panel. Dotted lines show alternative positions of the pivoting display panel.

FIG. 10B This is a magnified profile view of the two panel computer with a large diameter hinge. Dotted lines show alternative positions of the pivoting display panel.

FIG. 11A This shows the bag with the two panel computer with large diameter hinge ready for installation.

FIG. 11B This is a magnified view of the hinge area of the two panel computer with a large diameter hinge. The hinge covers the entire top surface of the computer body.

FIG. 12A This is the two panel computer with an extension between the hinge and display panel to serve to form a gap between the display panel and body panel.

FIG. 12B This is a magnified view of the hinge area of the two panel computer with an extension between the hinge and display panel.

FIG. 13A This is a profile view of the two panel computer with an extension between the hinge and display panel to serve to form a gap between the display panel and body panel. Dotted lines show alternative positions of the pivoting display panel.

FIG. 13B This is a magnified profile view of the hinge area of the two panel computer with an extension between the hinge and display panel. Dotted lines show alternative positions of the pivoting display panel.

FIG. 14 This shows the bag with the two panel computer with an extension between the hinge and display panel ready for installation.

DETAILED DESCRIPTION OF THE INVENTION

Figure 4:
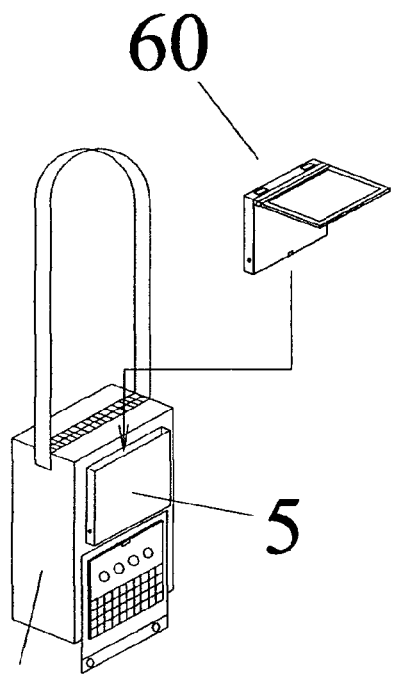
FIG. 4 This shows the bag with a computer ready to install.

A bag computer is a bag with a display panel, including input/output devices such as a display and graphic user input device, mounted to the exterior of the bag so it may pivot horizontally from a storage position parallel to the bag's front wall to a position away from the bag's front wall where the bag wearer/operator may view the display. The display panel and other computer equipment may be removable from the bag for replacement. The display panel may be positioned near the top front of the bag so that its display is as close as possible to the operator/wearer's eyes when it is pivoted out into the line of sight of the operator for use.

FIGS. 1A, 1B and 1C show how a bag computer is deployed and used. As shown in FIG. 1A the display panel, when mounted to the bag 1, is stored in front of and parallel to the bag front wall 3. The display panel may be covered with a cover 29, such as a cover flap or rigid shaped cover, and this cover may be pivotally fixed to the bag exterior near its center front so it can pivot closed up and over the display panel when it is in stored position. The cover is shown here in the closed position.

Shown in FIG. 1B, the cover 29 is opened and the display panel 12 is pivoted away from the bag front wall 3 with its display facing up, properly oriented so that when the bag computer is attached to the operators/wearer by its strap 30 the display 18 is in the line of sight of the operator/bag wearer and can be viewed and used.

Shown in FIG. 1C, the display panel 12 may be further pivoted to approximately 180 degrees from storage position so that the display faces back toward the operator/wearer's body. Display panel back side controls 81 can be seen. FIGS. 2 and 3 show a manikin wearing the bag computer and viewing the display 18 while the display panel 12 is pivoted to approximately 180 degrees from storage position. In FIG. 2 the manikin is sitting with the bag 1 bottom 47 resting on the operator's lap and the bag computer being restrained from falling by the strap 30. FIG. 3 shows that the 180 degree display panel position can also be used while the operator/wearer is lying.

Shown in FIG. 4, one way to make a bag computer is to have a two panel computer component 60 mounted to the matching bag 1 front using an outside computer holder 5, such as a pocket or holster, or inside mounting structure and coupling.

Figure 5A:
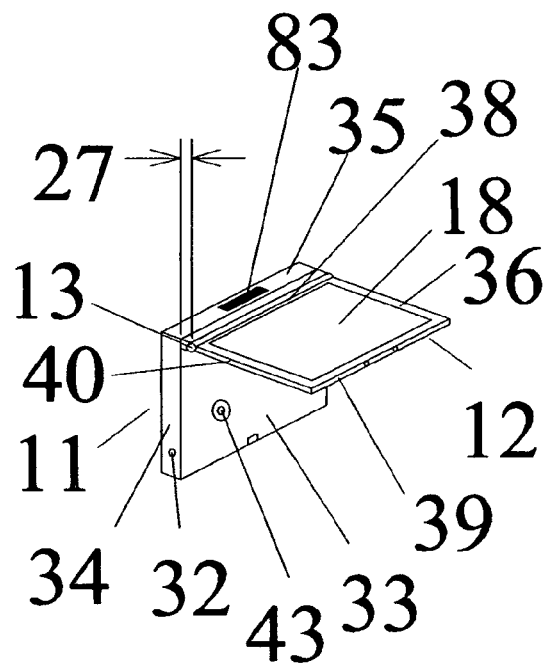
FIG. 5A This shows the various parts of a two panel computer for use with a bag computer.

As shown in FIG. 5A such a two panel computer component has a body panel 11 and a display panel 12. These are pivotally joined with a hinge means 13. These two panels are in closed position when the display panel back side and computer body panel front surface are adjacent and approximately parallel. The two panel computer is open when the two panels are pivoted into other positions.

The body panel has a front surface 33 adjacent to the display panel when the two panels are folded together in closed position. There is an opposite back surface, two side surfaces 34 and a top surface 35. The body may have shaping, alignment structures, attachments or other fixtures complimentary to matching fixtures on the bag.

There may also be one or more tools 43 such as controls, camera or infrared communicator on the computer body panel and these may align with holes in the computer holder for external communication. There may be one or more retainers 32 attachments on the body panel to match attachments on the computer holder and retain the two panel computer in the computer holder. The computer body top surface may include openings 83 for sound or heat dissipation.

The display panel 12 has a back side adjacent to the body panel when shut, an opposite front side 36, a hinge edge 38 adjacent to the hinge means, a distal edge 39 and two side edges 40. The display 18 is located on the front side of the display panel 12 so that when the display panel of the mounted two panel computer is pivoted open it moves into the line of sight of the operator/wearer of the bag computer. The display may include a touch screen.

The display panel and/or the body panel adjacent to the hinge means connecting them create an extension 27 away from the body so that there is a gap between the body panel front surface and display panel back side to allow the material of the bag's computer holder or bag front to fit between the panels so that the display panel can be pivoted to a closed position approximately parallel to the bag front wall when the two panel computer is installed to the bag.

Figure 5B:
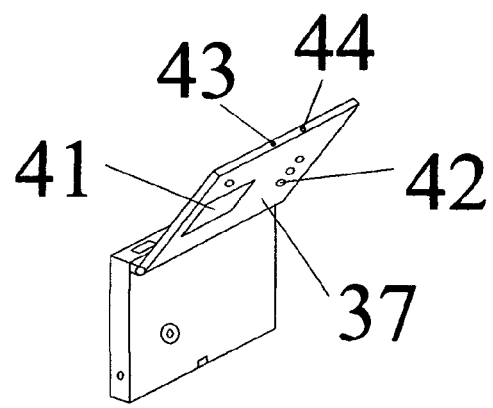
FIG. 5B This shows the two panel computer for use with a bag computer with its display panel pivoted up so the back side of the display panel is visible.

Shown in FIG. 5B is the two panel computer with its display panel pivoted upward so that the display panel backside is visible. The back side 37 of the display panel may have controls such as a pointing device, touch pad 41, buttons 42 or slides. The entire back side of the display panel may be one large touch pad and there may be fixed or removable finger guides to assist in locating particular controls on the display back side. In this way the operator can both view and control the two panel computer using input/output devices on the front and/or back sides of the display panel. There may also be input/output devices, such as a camera 43, infrared communicator 44, on the display panel distal edge. There may be additional controls on the display panel side edges.

As noted, the two panel computer component has a hinge means between its two panels with an extension which creates a gap between the display panel and body panel so that the bag front or the bag's computer holder may fit between the two panels when they are shut. This gap allows the display panel to move into the storage position approximately parallel to the bag front. The hinge may be adapted in several ways to form the needed extension and gap.

As shown in FIGS. 6A and 6B, one way to make this adaptation is to have the hinge extension 61 between the computer body 11 and hinge 13. A two panel computer with this hinge arrangement may be used for mounting outside the bag front or inside the bag front where the computer's display matches a display slot in the bag front.

If the two panel computer is mounted inside the bag, the computer's hinge area may match a coupling on the bag around the bag's display slot. The upper front and top of the computer body abutting the bag coupling may have vertical or horizontal ridges 72, pins 71, snap-like attachments or other molded in attachments or alignment features to match the bag's coupling. These match the bag coupling on any or all of its surfaces thus strengthening the combination, holding the parts together and keeping the display slot in the bag from spreading under the load of bag cargo. These matching attachment and alignment features may be wedge shaped 70 and may be aligned in parallel ridges so that the bag and two panel computer features easily slide together but cannot be pulled apart on any other axis. The alignment features may be curved so as to match the movement of the bag coupling as it is moved into place during the installation process.

The hinge extension may have an angle 53 that aims the hinge into the corner so that the display may be pivoted 180 degrees without having the upper part of the bag block part of the display.

Shown in profile view of the bag, FIGS. 7, 8A and 8B, there may be a bag with a display panel slot 79 coupling 64 around the display slot area to match an inside mounted two panel computer with extension between the computer body and hinge means. Such a bag would have a front wall 3, top wall 4, back wall, bottom wall and side walls. The top wall has an opening 78 to access the interior and install the two panel computer. The bag's coupling may be positioned in the corner between the bag's top and front walls and this coupling may be attached, for example with riveting, to either or both of the top and front walls. The coupling may pivot 66 to facilitate installation of the two panel computer.

The parts of the bag coupling abutting the front and top of the computer body may have vertical or horizontal ridges pins 65, wedges, snap-like attachments or other molded in attachments or alignment features which match the bag coupling thus strengthening the combination, holding the parts together and keeping the display slot in the bag from spreading under the load of bag cargo. There may also be a flap or pivoting lock 76 attached to the coupling or inside of the bag top wall which has a matching attachments, such as hook and loop or a clip, and this further assist in holding the two panel computer into the coupling. In addition, the bag may have a footing 77 and/or other attachments on the inside surface of the bag's front wall to complete the inside mounting structure of the bag. The footing in particular may be the flexible and flap like or holster like and may have matching attachments. Elastic may be included in the flap or bag front to hold the bag front taut. Instead, the footing may be one or more rigid ledge or hook like parts meant to match the lower area of the computer body and hold it to the bag front. The footing may include an electrical connection, such as a plug, for connecting the two panel computer to a keyboard on the bag front.

In a second embodiment of the hinge with extension, shown in FIGS. 9A and 9B, and as a side view in FIGS. 10A and 10B, the extension may be produced by making the hinge means 13 of large diameter and attaching the display panel 12 on or near the perimeter of the hinge and with its plane approximately on a cord or tangent 73 to the hinge diameter. The diameter or portion of the diameter 74 of the hinge becomes the extension. The pivot point 67 of the hinge may be positioned on the plane of the computer body front surface 33, top surface 35 or elsewhere near the junction of these two surfaces so that the display panel extends far enough in front of the bag's front wall to create a gap 27 needed for the display panel to closed position parallel to the bag front. The display panel may pivot to various positions, shown in dotted lines, to at least 180 degrees. This arrangement may allow for a larger and stronger hinge which may also be able to accommodate speakers 83, antenna or ventilation outlets.

Shown in FIG. 11A, this type of hinge arrangement is useful in mounting to a bag 1 front 3 where the bag's computer holder 5 holds and positions the computer body 11 with its display panel 12 near the bags top front corner 75. Shown in FIG. 11B, with thinner computer bodies, the large diameter hinge 13 may occupy all or most of the body's top surface.

In a third embodiment of the hinge with extension, shown in FIGS. 12A and 12B, and as a profile side view in FIGS. 13A and 13B, the extension may be produced by using an extension 61 of the hinge between the hinge 13 and the display panel 12. The extension may be angled 53 relative to the display panel to offset the display panel from the bag front when pivoted down approximately parallel to the bag computer front wall thus creating a gap 27 allowing the display panel to fold shut around the material of the computer holder. Alternative display panel positions while pivoting are shown in dotted lines. Controls 80, on the display back or computer body top may be provided. There may be an electrical connection 69 in the computer body top wall 14 or other wall for installing removable memory 68 which may contain, for example, recorded video material. The electrical connection may include a receptacle matching the memory apparatus so that the memory installs in conformity with the computer body shape.

As shown in FIG. 14, a two panel computer 60 with this type of hinge arrangement may be suited to mounting in a computer holder 5, such as a holster or pocket, on the outside of the bag's 1 front. The bag shown has a front wall 3, opposite back wall, and connecting walls including a top wall 4 with an opening 78 for accessing the bags interior cargo area. This bag style with a computer holder on the bag's outside front may be used with any of the embodiments here described. The computer holder is positioned so that the two panel computer's display panel pivots approximately around the junction of the bags top and front walls so the display is close to the operator's eyes. The computer holder may have one or more retainers 32 to hold the computer body in the holder or openings 82 to match tools on the computer body, such as camera or communicator. The bag may include a keyboard 9 or facilities to mount a keyboard to the bag front. The keyboard may be mounted on the pivoting cover 29 or to a separate pivoting mount on the bag front.

The invention claimed is:

1. A computing device for mobile use comprising:
 a) a body panel comprised of a front surface and a top surface;

b) a display panel comprised of a front side, a back side, and a hinge edge;

c) a hinge means joining the display panel hinge edge to the body panel near the junction of the front surface and top surface, wherein the display panel back side and body panel front surface are approximately parallel to each other when in a closed position, and wherein the display panel back side and body panel front surface are adjacent to each other when separated from the holder and in a closed position;

d) a display located on the front side of the display panel; and e) a bag comprised of a front wall including an inside surface and an outside surface, wherein the front wall is configured to hold the body panel to the bag, and wherein the display panel is positioned and oriented to pivot from a position approximately parallel to the bag front to a position in a line of sight of an operator/wearer.

2. The computing device of claim 1, wherein the computer body is held to the inside surface of the front wall.

3. The computing device of claim 1, further comprising a mounting structure on the inside surface of the front wall, the mounting structure adapted to removably hold the computer body to the front wall.

4. The computing device of claim 2, further comprising a display panel slot through the bag, wherein the display panel slot is positioned and oriented to allow the display panel to pivot from a storage position approximately parallel to the bag front into a line of sight of an operator/wearer for viewing.

5. The computing device of claim 4, further including a coupling near the display panel slot, wherein the coupling and computer body near the hinge means have one of a matching alignment feature or an attachment feature.

6. The computing device of claim 3, wherein the mounting structure comprises a footing located in the inside of the front wall, matching the computer body, and removably holding the computer body to the bag front.

7. The computing device of claim 1, wherein the computer body is held to the outside surface of the front wall.

8. The computing device of claim 7, wherein the bag is further comprised of a computer holder on the outside surface of the front wall of the bag, the computer holder configured to removably hold the computer body to the front wall with the display panel positioned and oriented to pivot from a storage position approximately parallel to the bag front to an operating position in a line of sight of an operator/wearer.

9. The computing device of claim 8, wherein the computer body is shaped to fit the computer holder.

10. The computing device of claim 8, further comprising an opening on the holder, the opening matching a camera on the computer body.

11. The computing device of claim 1 wherein the hinge means is adapted to create a gap between the body panel front surface and the display panel back side, the gap allowing one of a front wall and a portion of the computer holder to fit between the body panel front surface and the display panel back side.

12. The computing device of claim 11, wherein the gap between the body panel front surface and the display panel back side is created by an extension between the body and hinge means.

13. The computing device of claim 11, wherein the gap between the body panel front surface and the display panel back side is created by an extension between the display panel and hinge means.

14. The computing device of claim 11, wherein the gap between the body panel front surface and the display panel back side is created by a large diameter hinge, wherein at least a portion of the diameter of the hinge extends beyond the plane of the front surface of the body.

15. The computing device of claim 1, further comprising a tool on the front surface of the computer body, the tool comprising one of a camera and infrared communicator.

16. The computing device of claim 1, further comprising a control on the display panel.

17. The computing device of claim 16, wherein the control is on the back side of the display panel.

18. The computing device of claim 1, wherein the bag is further comprised of a top wall, wherein the top wall and computer body have matching attachment or alignment features.

19. A computing device for mobile use comprising:

a) a body panel comprised of a front surface and a top surface;

b) a display panel comprised of a front side, a back side, and a hinge edge;

c) a hinge means joining the display panel hinge edge to the body panel near the junction of the front surface and top surface, wherein the display panel back side and body panel front surface are approximately parallel to each other when in a closed position, and wherein the display panel back side and body panel front surface are adjacent to each other when separated from the holder and in a closed position;

d) a display located on the front side of the display panel; and e) a computer holder, the computer holder configured to hold the computer body to a wall of an object, and wherein the display panel pivots from a position approximately parallel to the body panel front surface to a position in a line of sight of an operator.

20. The computing device of claim 19, wherein the hinge means is adapted to create a gap between the body panel front surface and the display panel back side, the gap allowing a portion of the computer holder to fit between the body panel front surface and the display panel back side.

21. The computing device of claim 20, wherein the gap between the body panel front surface and the display panel back side is created by an extension between the body and hinge means.

22. The computing device of claim 20, wherein the gap between the body panel front surface and the display panel back side is created by an extension between the display panel and hinge means.

23. The computing device of claim 20, wherein the gap between the body panel front surface and the display panel back side is created by a large diameter hinge, wherein at least a portion of the diameter of the hinge extends beyond the plane of the front surface of the body.

24. The computing device of claim 19, further comprising a tool on the front surface of the computer body, the tool comprising one of a camera and infrared communicator.

25. The computing device of claim 19, further comprising a control on the display panel.

26. The computing device of claim 25, wherein the control is on the back side of the display panel.

27. The computing device of claim 19, further comprising an opening on the computer holder, the opening matching a tool on the computer body.

* * * * *